United States Patent
Guo et al.

(10) Patent No.: US 11,245,974 B2
(45) Date of Patent: Feb. 8, 2022

(54) WIRELESS EARPHONE AND METHOD FOR CONTROLLING A WIRELESS EARPHONE

(71) Applicant: MERRY ELECTRONICS (SUZHOU) CO., LTD., Suzhou (CN)

(72) Inventors: Dean Guo, Suzhou (CN); Tianliang Zhang, Suzhou (CN)

(73) Assignee: MERRY ELECTRONICS (SUZHOU) CO., LTD., Suzhou (CN)

( * ) Notice: Subject to any disclaimer, the term of this patent is extended or adjusted under 35 U.S.C. 154(b) by 0 days.

(21) Appl. No.: 17/141,768

(22) Filed: Jan. 5, 2021

(65) Prior Publication Data

US 2021/0352397 A1 Nov. 11, 2021

(30) Foreign Application Priority Data

May 11, 2020 (CN) .......................... 202010392959.X

(51) Int. Cl.
*H04R 1/10* (2006.01)
*H02J 50/90* (2016.01)
*H02J 50/70* (2016.01)

(52) U.S. Cl.
CPC ............ *H04R 1/1025* (2013.01); *H02J 50/70* (2016.02); *H02J 50/90* (2016.02); *H04R 1/1016* (2013.01); *H04R 1/1041* (2013.01); *H04R 2201/109* (2013.01); *H04R 2420/07* (2013.01)

(58) Field of Classification Search
CPC .. H04R 1/1025; H04R 1/1016; H04R 1/1041; H02J 50/90; H02J 50/70
See application file for complete search history.

(56) References Cited

U.S. PATENT DOCUMENTS

| 11,172,101 | B1* | 11/2021 | Boozer | ............... H04R 1/1041 |
| 2017/0060262 | A1* | 3/2017 | Hviid | ................... B65D 77/22 |
| 2017/0064433 | A1* | 3/2017 | Hirsch | .............. H05K 999/99 |

(Continued)

FOREIGN PATENT DOCUMENTS

| CN | 109413535 A | 3/2019 |
| CN | 109466861 A | 3/2019 |

(Continued)

OTHER PUBLICATIONS

Chinese Office Action for Chinese Application No. 202010392959. X, dated Jun. 30, 2021, with an English translation of the Office Action and Search Report.

*Primary Examiner* — Simon King
(74) *Attorney, Agent, or Firm* — Birch, Stewart, Kolasch & Birch, LLP

(57) ABSTRACT

Provided are a wireless earphone and a method for controlling a wireless earphone. The wireless earphone includes a charging box and an earpiece placed in the charging box. A charging box open/closed-state sensor, an earpiece attitude sensor and a magnetic-field control circuit are disposed in the charging box. The charging box open/close-state sensor is configured to detect an open state of the charging box or a closed state of the charging box. The earpiece attitude sensor is configured to detect an orientation attitude of the earpiece in the charging box. The magnetic-field control circuit controls, according to results detected by the charging box open/closed-state sensor and the earpiece attitude sensor, whether the earpiece is suspended from the charging box.

12 Claims, 2 Drawing Sheets

(56) References Cited

U.S. PATENT DOCUMENTS

| | | | | |
|---|---|---|---|---|
| 2017/0093079 A1* | 3/2017 | Wagman | ............... | H04R 1/02 |
| 2018/0060031 A1* | 3/2018 | Boesen | ............... | A61B 5/6817 |
| 2020/0233046 A1* | 7/2020 | Ding | ............... | G06F 1/1677 |
| 2021/0152921 A1* | 5/2021 | Silva | ............... | H04R 1/1025 |

FOREIGN PATENT DOCUMENTS

| | | | |
|---|---|---|---|
| CN | 109640208 | A | 4/2019 |
| CN | 119611858 | A | 12/2019 |
| CN | 209845262 | U | 12/2019 |
| CN | 210042159 | U | 2/2020 |
| CN | 111031440 | A | 4/2020 |
| EP | 3 154 275 | A1 | 4/2017 |

\* cited by examiner

WIRELESS EARPHONE AND METHOD FOR CONTROLLING A WIRELESS EARPHONE

CROSS-REFERENCE TO RELATED APPLICATION

This application claims priority to a Chinese Patent Application No. 202010392959.X filed May 11, 2020, the disclosure of which is incorporated herein by reference in its entirety.

TECHNICAL FIELD

The present disclosure relates to the technical field of wireless earphones and, in particular, to a wireless earphone and a method for controlling a wireless earphone.

BACKGROUND

With the rapid development of communication devices, wireless earphones are currently used by more and more users.

Currently, a true wireless stereo (TWS) earpiece is accommodated in a charging box mainly in a magnetic attraction mode. That is, permanent magnets are disposed in the earpiece and the charging box, thereby ensuring the earpiece is attracted in the charging box by magnetic attraction. However, a certain earpiece may have a small part exposed from the charging box, and the exposed part is relatively smooth, resulting in that it is not convenient to take the earpiece out of the charging box. Meanwhile, to ensure a certain magnetic attraction effect when the earpiece is accommodated in the charging box, magnets with relatively high residual magnetization are usually filled in the earpiece and the charging box, thereby increasing the weight of the complete machine, so that it is quite inconvenient for a user to take out the earpiece.

SUMMARY

The present disclosure provides a wireless earphone and a method for controlling a wireless earphone, which makes it more convenient for a user to take an earpiece out of a charging box and can also avoid the case where the earpiece is damaged due to the user pulling out the earpiece by force, thereby improving the user experience.

In a first aspect, the present disclosure provides a wireless earphone. The wireless earphone includes a charging box and an earpiece placed in the charging box. A charging box open/close-state sensor, an earpiece attitude sensor and a magnetic-field control circuit are disposed in the charging box.

The charging box open/close-state sensor is configured to detect an open state of the charging box or a closed state of the charging box.

The earpiece attitude sensor is configured to detect an orientation attitude of the earpiece in the charging box.

The magnetic-field control circuit is configured to control, according to results detected by the charging box open/closed state sensor and the earpiece attitude sensor, whether the earpiece is suspended from the charging box.

In a second aspect, the present disclosure further provides a method for controlling a wireless earphone. The method includes the wireless earphone of any embodiment of the present disclosure.

DETAILED DESCRIPTION

Figure 1A:
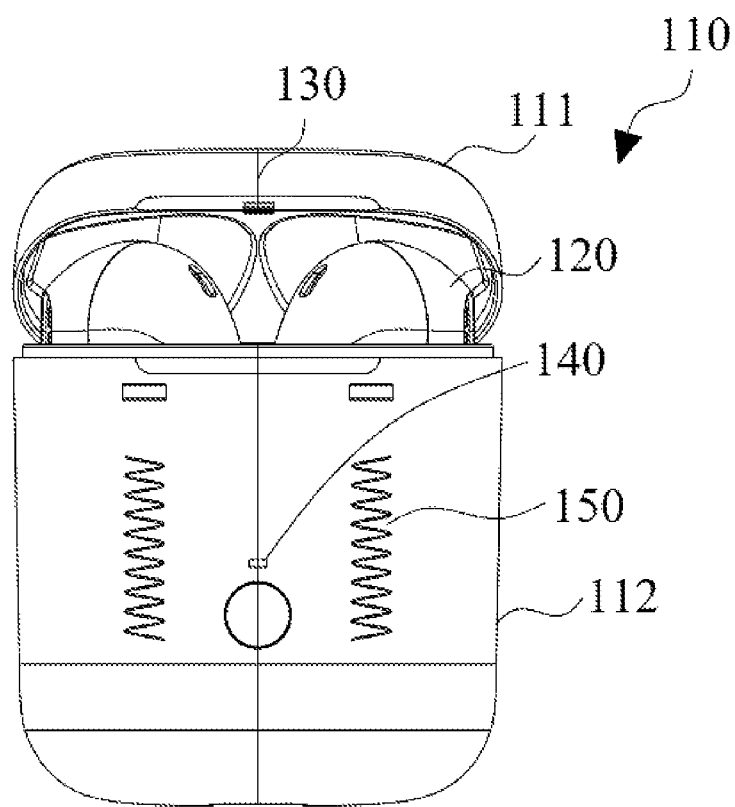
FIG. 1A is a schematic structure diagram of a wireless earphone according to embodiment one of the present disclosure.

Hereinafter the present disclosure is further described in detail in conjunction with the drawings and embodiments. It is to be understood that the specific embodiments set forth below are intended to illustrate and not to limit the present disclosure. Additionally, it is to be noted that for ease of description, only part, not all, of the structures related to the present disclosure are illustrated in the drawings.

Before the exemplary embodiments are discussed in more detail, it is to be noted that part of the exemplary embodiments are described as processing or methods depicted in flowcharts. Although the flowcharts describe the steps as sequentially processed, many of the steps may be implemented concurrently, coincidently or simultaneously. Additionally, the sequence of the steps may be rearranged. The processing may be terminated when the operations are completed, but may further have additional steps not included in the drawings. The processing may correspond to a method, a function, a procedure, a subroutine, a subprogram or the like.

Embodiment One

FIG. 1A is a schematic structure diagram of a wireless earphone according to embodiment one of the present disclosure. This embodiment is applicable to a case of taking wireless earpieces out of a charging box. The wireless earphone includes a charging box 110 and an earpiece 120 placed in the charging box 110. In an example, the wireless earphone includes a pair of earpieces 120 as shown in FIG. 1A. A charging box open/closed-state sensor 130, an earpiece attitude sensor 140 and a magnetic-field control circuit 150 are disposed in the charging box 110 (where only a spiral coil of the magnetic-field control circuit is shown in FIG. 1A).

The charging box open/close-state sensor 130 is configured to detect an open state of the charging box or a closed state of the charging box 110.

In this embodiment of the present disclosure, the charging box open/closed-state sensor 130 may be an infrared sensor, a pressure sensor, or another sensor capable of measuring a distance. The infrared sensor can sense infrared rays radiated from a target and is used for measurement by using physical properties of the infrared rays. The pressure sensor is a device or apparatus that can detect a pressure signal and convert the pressure signal into an output electrical signal according to a certain rule. Specifically, the infrared sensor may be installed at the inner top of the charging box 110, an infrared ray detected by the infrared sensor disposed in the charging box 110 in the open state of the charging box 110 is different from an infrared ray detected by the infrared sensor disposed in the charging box 110 in the closed state of the charging box 110, and the open state or the closed state of the charging box 110 can be determined through the different infrared rays in the two states. Specifically, the pressure sensor may also be installed at the inner top of the charging box 110, and a pressure value of the charging box 110 in the open state of the charging box 110 is different from a pressure value of the charging box 110 in the closed state of the charging box 110, so that the open state and the closed state of the charging box 110 are determined through the different pressure values.

Optionally, the charging box 110 includes a charging box cover 111 and a charging box body 112.

Correspondingly, the charging box open/closed-state sensor 130 is configured to determine that the charging box 110 is in the open state in the case where a distance between the charging box cover 111 and the charging box body 112 is greater than a preset distance value.

In this embodiment, the preset distance value may be from factory setting of the wireless earphone, or may be set by a user. In the case where the distance between the charging box cover 111 and the charging box body 112 is greater than the preset distance value, it is known that the charging box 110 is in the open state.

The earpiece attitude sensor 140 is configured to detect an orientation attitude of the earpiece 120 in the charging box 110.

In this embodiment, the earpiece attitude sensor 140 may be a gyroscope, an acceleration sensor, or any sensor capable of detecting the attitude of the earpiece 120. The acceleration sensor is generally composed of a mass block, a damper, a resilient element, a sensing element, an adaptive circuit and the like. The orientation attitude of the earpiece 120 in the charging box 110 refers to that the earphone piece 120 is upward or downward in the charging box 110.

Optionally, the earpiece attitude sensor 140 is configured to determine that the earpiece 120 is in an upward attitude in the charging box 110 in the case where a resultant force of the earpiece 120 is upward, and an included angle between a vertical upward direction and a direction of the resultant force the earpiece 120 is less than a preset angle.

In this embodiment, the earpiece attitude sensor 140 can detect the direction of the resultant force direction of the earpiece 120. Exemplarily, the preset angle is 30 degrees in the case where the included angle between the direction of the resultant force and the vertical upward direction is less than the preset angle. In the preceding case, it can be determined that the earpiece 120 is in the upward attitude in the charging box 110. In this case, the earpiece 120 will not fall out of the charging box 110 when taken out of the charging box 110.

The magnetic-field control circuit 150 controls, according to results detected by the charging box open/closed-state sensor 130 and the earpiece attitude sensor 140, whether the earpiece 120 is suspended from the charging box 110.

In this embodiment, the magnetic-field control circuit 150 can control, according to a magnetic field, whether the earpiece 120 is suspended from the charging box 110.

Optionally, the magnetic-field control circuit 150 includes a spiral coil 151 and a reverse circuit 152 in series, and a permanent magnet is disposed in the earpiece 120.

The magnetic-field control circuit 150 is configured to adjust a conduction state of the reverse circuit 152 according to the results detected by the charging box open/closed-state sensor 130 and the earpiece attitude sensor 140, and control whether the earpiece 120 is suspended from the charging box 110 by enabling the permanent magnet and a magnetic field generated by the spiral coil 151 to cooperate with each other according to the conduction state of the reverse circuit.

Figure 1B:
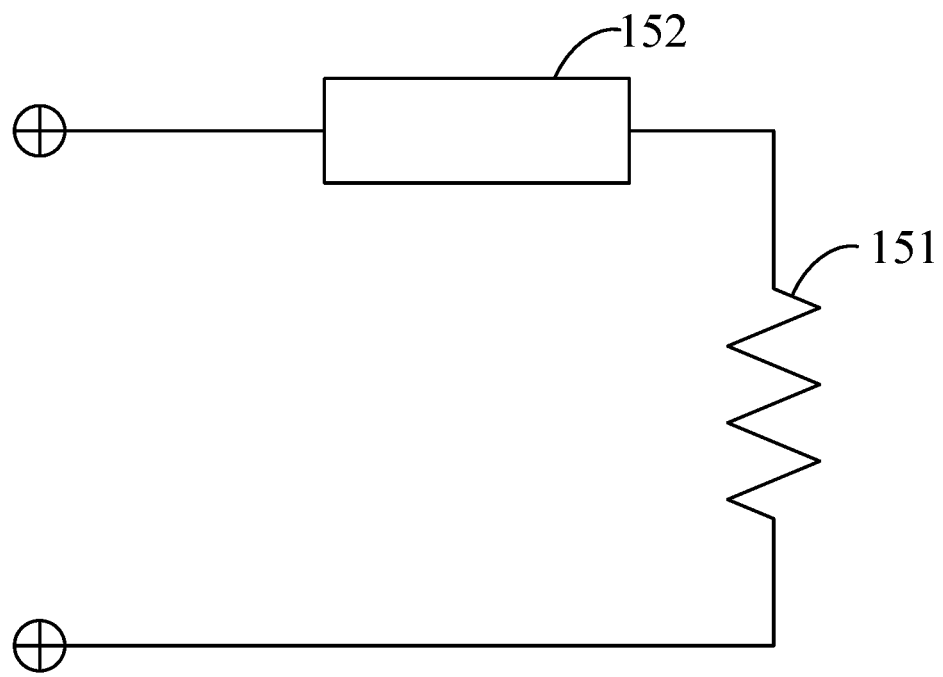
FIG. 1B is a schematic structure diagram of a magnetic-field control circuit according to embodiment one of the present disclosure.

In this embodiment, reference may be made to a schematic structure diagram of a magnetic-field control circuit shown in FIG. 1B. Specifically, the spiral coil 151 is disposed in the charging box 110, the permanent magnet is disposed in the earpiece 120, and the permanent magnet and the magnetic field generated by the spiral coil attract or repel each other to control whether the earpiece 120 is suspended from the charging box 110.

Optionally, if the charging box open/closed-state sensor 130 detects that the charging box 110 is in the open state and the earpiece attitude sensor 140 detects that the earpiece 120 is in the upward attitude in the charging box 110, the magnetic-field control circuit 150 controls the reverse circuit 152 to be conducted, the permanent magnet and the magnetic field generated by the spiral coil 151 repel each other since the reverse circuit is conducted, and the earpiece 120 is suspended from the charging box 110.

In this embodiment of the present disclosure, in response to detecting that the charging box 110 is in the open state while the earpiece 120 is not in the upward attitude in the charging box 110, it is indicated that the charging box 110 may be operated by mistake. In this case, the magnetic-field control circuit 150 controls the reverse circuit 152 to be disconnected, the permanent magnet and the magnetic field generated by the spiral coil 151 attract each other since the reverse circuit is disconnected, and the earpiece 120 is accommodated in the charging box 110. This can prevent the earpiece 120 from falling out of the charging box 110, and thus, avoid damaging the earpiece 120.

In the case where the charging box 110 is detected to be in the open state, and the earpiece attitude sensor 140 detects that the earpiece 120 is in the upward attitude in the charging box 110, it can be determined that the charging box 110 is opened and the user determines to take out the earpiece 120. At this time, the earpiece 120 is suspended from the charging box 110 so that the user can take out the earpiece 120 without pulling by force.

Optionally, if the charging box open/closed-state sensor 130 detects that the charging box 110 is in the closed state and the earpiece attitude sensor 140 detects that the earpiece 120 is in a downward attitude in the charging box 110, the magnetic-field control circuit 150 controls the reverse circuit 152 to be disconnected, the permanent magnet and the magnetic field generated by the spiral coil 151 attract each other since the reverse circuit is disconnected, and the earpiece 120 is fixedly accommodated in the charging box 110.

In this embodiment, in response to detecting the charging box 110 is in the closed state and the earpiece 120 is in the downward attitude in the charging box 110, it can be determined that the user does not intend to take out the earpiece 120. At this time, the magnetic-field control circuit 150 controls the reverse circuit 152 to be disconnected, the permanent magnet and the magnetic field generated by the spiral coil 151 attract each other since the reverse circuit is disconnected, and the earpiece 120 is accommodated in the charging box 110.

The present disclosure provides a wireless earphone including a charging box 110 and an earpiece 120 placed in the charging box 110. A charging box open/closed-state sensor 130, an earpiece attitude sensor 140 and a magnetic-field control circuit 150 are disposed in the charging box 110. The charging box open/close-state sensor 130 is configured to detect an open state of the charging box or a closed state of the charging box 110. The earpiece attitude sensor 140 is configured to detect an orientation attitude of the earpiece 120 in the charging box 110. The magnetic-field control circuit 150 controls, according to results detected by the charging box open/closed-state sensor 130 and the earpiece attitude sensor 140, whether the earpiece 120 is suspended from the charging box 110. This makes it more convenient for a user to take the earpiece 120 out of the charging box 110, and can also avoid the case where the earpiece is damaged due to the user pulling out the earpiece 120 by force, thereby improving the user experience.

Embodiment Two

Figure 2:
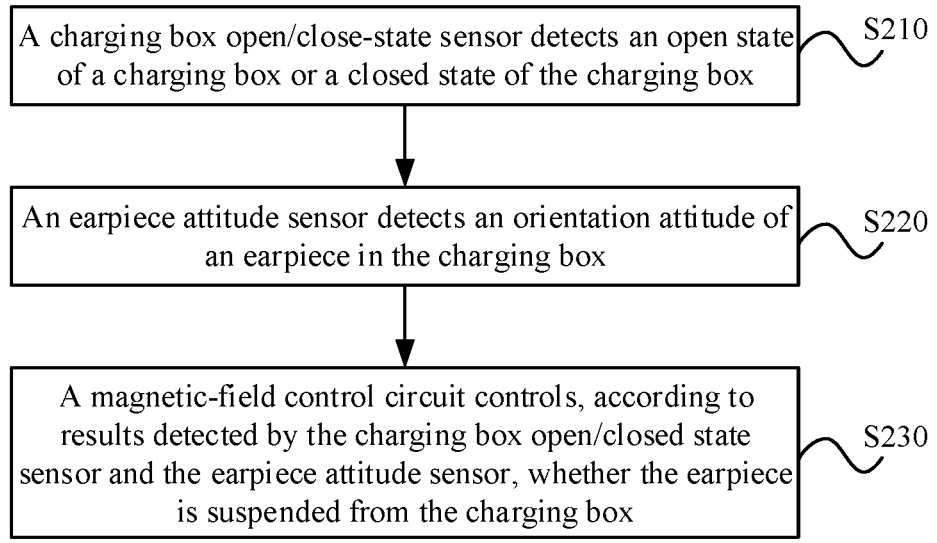
FIG. 2 is a flowchart of a method for controlling a wireless earphone according to embodiment two of the present disclosure.

FIG. 2 is a flowchart of a method for controlling a wireless earphone according to embodiment two of the present disclosure. This embodiment is applicable to a case where a user takes earpieces out of a charging box. The method may be executed by a wireless earphone and specifically includes the steps described below.

In step S210, a charging box open/close-state sensor detects an open state of a charging box or a closed state of the charging box.

In this embodiment of the present disclosure, the charging box open/closed-state sensor may be an infrared sensor, a pressure sensor, or another sensor capable of measuring a distance. The infrared sensor can sense infrared rays radiated from a target and is used for measurement by using physical properties of the infrared rays. The pressure sensor is a device or apparatus that can detect a pressure signal and convert the pressure signal into an output electrical signal according to a certain rule. Specifically, the infrared sensor may be installed at the inner top of the charging box, an infrared ray detected by the infrared sensor disposed in the charging box 110 in the open state of the charging box 110 is different from an infrared ray detected by the infrared sensor disposed in the charging box 110 in the closed state of the charging box 110, and the open state or the closed state of the charging box 110 can be determined through the different infrared rays in the two states. Specifically, the pressure sensor may also be installed at the inner top of the charging box 110, and a pressure value of the charging box 110 in the open state of the charging box 110 is different from a pressure value of the charging box 110 in the closed state of the charging box 110, so that the open state and the closed state of the charging box 110 are determined through the different pressure values.

Optionally, the charging box includes a charging box cover and a charging box body.

Correspondingly, the charging box is determined to be in the open state in the case where the charging box open/closed-state sensor detects that a distance between the charging box cover and the charging box body is greater than a preset distance value.

In this embodiment, the preset distance value may be from factory setting of the wireless earphone, or may be set by the user. In the case where the distance between the charging box cover and the charging box body is greater than the preset distance value, it is known that the charging box is in the open state.

In step 220, an earpiece attitude sensor detects an orientation attitude of an earpiece in the charging box.

In this embodiment, the earpiece attitude sensor may be a gyroscope, an acceleration sensor, or any sensor capable of detecting the attitude of the earpiece. The acceleration sensor is generally composed of a mass block, a damper, a resilient element, a sensing element, an adaptive circuit and the like. The orientation attitude of the earpiece in the charging box refers to that the earphone piece is upward or downward in the charging box.

Optionally, the earpiece is determined to be in an upward attitude in the charging box in the case where the earpiece attitude sensor detects that a resultant force of the earpiece is upward and an included angle between a vertical upward direction and a direction of the resultant force of the earpiece is less than a preset angle.

In this embodiment, the earpiece attitude sensor can detect the direction of the resultant force of the earpiece. Exemplarily, the preset angle is 30 degrees in the case where the included angle between the direction of the resultant force and the vertical upward direction is less than the preset angle.

In step S230, a magnetic-field control circuit controls, according to results detected by the charging box open/closed state sensor and the earpiece attitude sensor, whether the earpiece is suspended from the charging box.

In this embodiment, the magnetic-field control circuit can control, according to a magnetic field, whether the earpiece is suspended from the charging box.

Optionally, the step in which the magnetic-field control circuit of controls, according to the results detected by the charging box open/closed state sensor and the earpiece attitude sensor, whether the earpiece is suspended from the charging box includes the steps described below.

The magnetic-field control circuit adjusts a conduction state of a reverse circuit according to the results detected by the charging box open/closed state sensor and the earpiece attitude sensor.

A permanent magnet and a magnetic field generated by a spiral coil cooperate with each other to control whether the earpiece is suspended from the charging box.

In this embodiment, the spiral coil is disposed in the charging box, the permanent magnet is disposed in the earpiece, and the permanent magnet and the magnetic field generated by the spiral coil attract or repel each other to control whether the earpiece is suspended from the charging box.

Optionally, if the charging box open/closed-state sensor detects that the charging box is in the open state and the earpiece attitude sensor detects that the earpiece is in the upward attitude in the charging box, the magnetic-field control circuit controls the reverse circuit to be conducted, the permanent magnet and the magnetic field generated by the spiral coil repel each other since the reverse circuit is conducted, and the earpiece is suspended from the charging box.

In this embodiment of the present disclosure, in response to detecting that the charging box is in the open state while the earpiece is not in the upward attitude in the charging box, it is indicated that the charging box may be operated by mistake. In this case, the magnetic-field control circuit controls the reverse circuit to be disconnected, the permanent magnet and the magnetic field generated by the spiral coil attract each other since the reverse circuit is disconnected, and the earpiece is fixedly accommodated in the charging box. This can prevent the earpiece from falling out of the charging box, and thus, avoid damaging the earpiece.

Optionally, if the charging box open/closed-state sensor detects that the charging box is in the closed state and the earpiece attitude sensor detects that the earpiece is in a downward attitude in the charging box, the magnetic-field control circuit controls the reverse circuit to be disconnected, the permanent magnet and the magnetic field generated by the spiral coil attract each other since the reverse circuit is disconnected, and the earpiece is fixedly accommodated in the charging box.

In this embodiment, in response to detecting the charging box is in the closed state and the earpiece is in the downward attitude in the charging box, it can be determined that the user does not intend to take out the earpiece. At this time, the magnetic-field control circuit controls the reverse circuit to be disconnected, the permanent magnet and the magnetic field generated by the spiral coil attract each other since the reverse circuit is disconnected, and the earpiece is accommodated in the charging box.

The present disclosure provides a method for controlling a wireless earphone. A charging box open/close-state sensor detects an open state of a charging box or a closed state of the charging box, an earpiece attitude sensor detects an orientation attitude of an earpiece in the charging box, and a magnetic-field control circuit controls, according to results detected by the charging box open/closed-state sensor and the earpiece attitude sensor, whether the earpiece is suspended from the charging box. This can avoid the case where the earpiece is damaged due to a user pulling out the earpiece by force, thereby improving the user experience.

Embodiment Three

Figure 3:
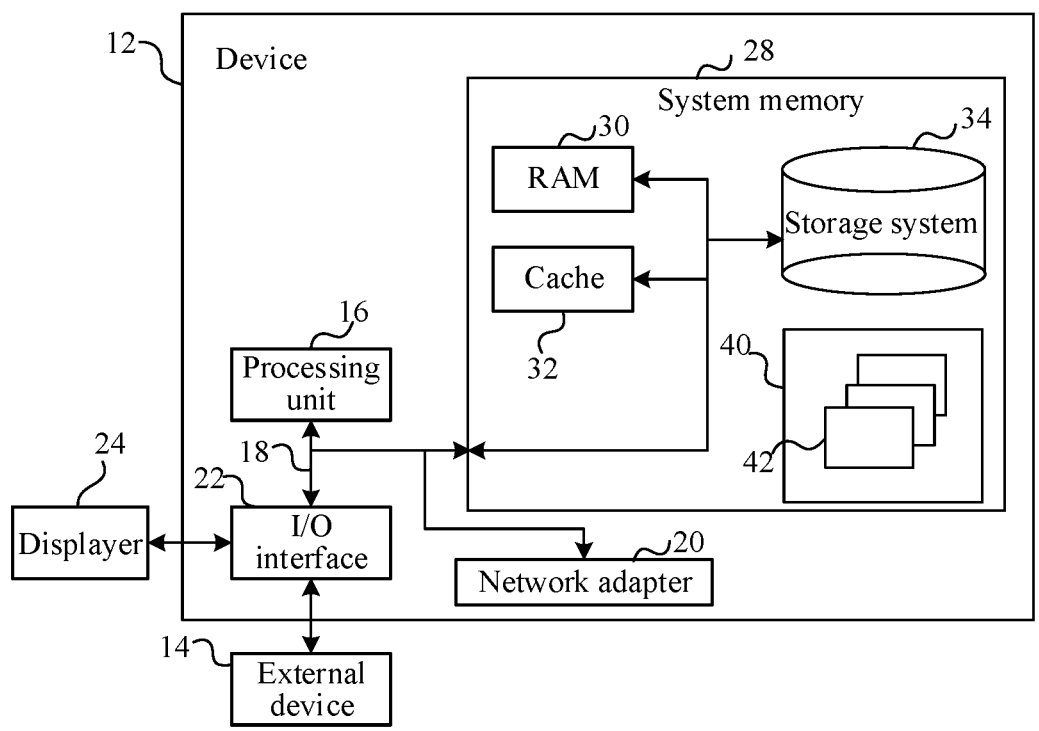
FIG. 3 is a schematic structure diagram of a device according to embodiment three of the present disclosure.

FIG. 3 is a schematic structure diagram of a device according to embodiment three of the present disclosure. FIG. 3 is a schematic structure diagram of an exemplary device for implementing the embodiments of the present disclosure. The device 12 shown in FIG. 3 is merely an example and is not intended to limit the function and use scope of the embodiments of the present disclosure.

As shown in FIG. 3, the device 12 may take a form of a general-purpose computer device. Components of the device 12 may include, but are not limited to, one or more processors or processing units 16, a storage apparatus 28, and a bus 18 connecting different system components (including the storage apparatus 28 and the one or more processing units 16).

The bus 18 represents one or more of several types of bus structures including a storage apparatus bus or a storage apparatus controller, a peripheral bus, a graphics acceleration port, a processor, or a local bus using any one of multiple bus structures. For example, these architectures include, but are not limited to, an industrial standard architecture (ISA) bus, a micro channel architecture (MAC) bus, an enhanced ISA bus, a video electronics standards association (VESA) local bus and a peripheral component interconnect (PCI) bus.

The device 12 typically includes multiple computer system readable media. These media may be available media that can be accessed by the device 12. These media include volatile and non-volatile media, and removable and non-removable media.

The storage apparatus 28 may include a computer system readable medium in the form of a volatile memory, such as a random access memory (RAM) 30 and/or a cache memory 32. The device 12 may further include other removable/non-removable and volatile/non-volatile computer system storage media. Just for example, a storage system 34 may be configured to perform reading and writing on a non-removable and non-volatile magnetic medium (not shown in FIG. 3 and usually referred to as a "hard disk driver"). Although not shown in FIG. 3, it is feasible to provide not only a magnetic disk driver for performing reading and writing on a removable non-volatile magnetic disk (for example, a "floppy disk"), but also an optical disk driver for performing reading and writing on a removable non-volatile optical disk, such as a compact disc read-only memory (CD-ROM), a digital video disc-read only memory (DVD-ROM) or other optical media. In these cases, each driver may be connected to the bus 18 via one or more data media interfaces. The storage apparatus 28 may include at least one program product having a group of program modules (for example, at least one program module). These program modules are configured to perform functions of various embodiments of the present disclosure.

A program/utility tool 40 having a group of program modules 42 (at least one program module 42) may be stored in the storage apparatus 28 or the like. Such program modules 42 include, but are not limited to, an operating system, one or more application programs, other program modules and program data. Each or some combination of these examples may include implementation of a network environment. The program modules 42 generally perform functions and/or methods in embodiments of the present disclosure.

The device 12 may communicate with one or more external devices 14 (for example, a keyboard, a pointing terminal and a displayer 24). The device 12 may communicate with one or more terminals that enable a user to interact with the device 12, and/or with any device (for example, a network card or a modem) that enables the device 12 to communicate with one or more other computing devices. These communications may be performed through an input/output (I/O) interface 22. Moreover, the device 12 may communicate with one or more networks (such as a local area network (LAN), a wide area network (WAN) and/or a public network, for example, the Internet) through a network adapter 20. As shown in FIG. 3, the network adapter 20 communicates with other modules of the device 12 via the bus 18. It is to be understood that although not shown in FIG. 3, other hardware and/or software modules may be used in conjunction with the device 12. The other hardware and/or software modules include, but are not limited to, microcode, a terminal driver, a redundant processing unit, an external disk drive array, a redundant arrays of independent disks (RAID) system, a tape driver, a data backup storage system and the like.

The one or more processing units 16 execute a program stored in the system memory 28 to perform various functional applications and data processing, for example, to perform the method for controlling a wireless earphone provided by the embodiment of the present disclosure. The method includes the steps described below.

A charging box open/close-state sensor detects an open state of a charging box or a closed state of the charging box.

An earpiece attitude sensor detects an orientation attitude of an earpiece in the charging box.

A magnetic-field control circuit controls, according to results detected by the charging box open/closed state sensor and the earpiece attitude sensor, whether the earpiece is suspended from the charging box.

Embodiment Four

Embodiment four of the present disclosure further provides a computer-readable storage medium storing a computer program (or referred to as computer executable instructions). When the program is executed by the processor, a method for controlling a wireless earphone according to any one of the preceding embodiments may be performed. The method includes the steps described below.

A charging box open/close-state sensor detects an open state of a charging box or a closed state of the charging box.

An earpiece attitude sensor detects an orientation attitude of an earpiece in the charging box.

A magnetic-field control circuit controls, according to results detected by the charging box open/closed state sensor and the earpiece attitude sensor, whether the earpiece is suspended from the charging box.

The computer storage medium of this embodiment of the present disclosure may employ any combination of one or more computer-readable media. The computer-readable medium may be a computer-readable signal medium or a computer-readable storage medium. The computer-readable storage medium may be, but is not limited to, an electrical, magnetic, optical, electromagnetic, infrared or semiconductor system, apparatus or device, or any combination thereof. More specific examples of the computer-readable storage medium include (non-exhaustive list): an electrical connection having one or more wires, a portable computer magnetic disk, a hard disk, a random access memory (RAM), a read only memory (ROM), an erasable programmable read only memory (EPROM or flash memory), an optical fiber, a portable compact disk read only memory (CD-ROM), an optical memory device, a magnetic memory device, or any suitable combination thereof. In the present disclosure, the computer-readable storage medium may be any tangible medium containing or storing a program. The program may be used by an instruction execution system, apparatus or device individually or in combination.

The computer-readable signal medium may include a data signal propagated on a base band or as a part of a carrier wave. The data signal carries computer-readable program codes. Such propagated data signals may take multiple forms including, but not limited to, electromagnetic signals, optical signals, or any suitable combination thereof. The computer-readable signal medium may further be any computer-readable medium other than a computer-readable storage medium. The computer-readable medium may send, propagate or transmit the program used by the instruction execution system, apparatus or device individually or in combination.

Program codes contained in the computer-readable medium may be transmitted via any suitable medium. The medium includes, but is not limited to, the wireless, a wire, an optical cable, the radio frequency (RF) or the like, or any suitable combination thereof.

Computer program codes for performing the operations of the present disclosure may be written in one or more programming languages or combination thereof. These programming languages include object-oriented programming languages such as Java, Smalltalk, C++, as well as conventional procedural programming languages such as "C" or similar programming languages. The program codes may be executed entirely or partially on a user computer, as a separate software package, partially on the user computer and partially on a remote computer, or entirely on the remote computer or server. In the case relating to the remote computer, the remote computer may be connected to the user computer via any kind of network including a local area network (LAN) or a wide area network (WAN), or may be connected to an external computer (for example, via the Internet through an Internet service provider).

It is to be noted that the above are merely preferred embodiments of the present disclosure and the technical principles used therein. It is to be understood by those skilled in the art that the present disclosure is not limited to the specific embodiments described herein. Those skilled in the art can make various apparent modifications, adaptations and substitutions without departing from the scope of the present disclosure. Therefore, while the present disclosure has been described in detail through the preceding embodiments, the present disclosure is not limited to the preceding embodiments and may include more other equivalent embodiments without departing from the concept of the present disclosure. The scope of the present disclosure is determined by the scope of the appended claims.

What is claimed is:

1. A wireless earphone, comprising: a charging box and an earpiece placed in the charging box, wherein a charging box open/closed-state sensor, an earpiece attitude sensor and a magnetic-field control circuit are disposed in the charging box, wherein
    the charging box open/close-state sensor is configured to detect an open state of the charging box or a closed state of the charging box;
    the earpiece attitude sensor is configured to detect an orientation attitude of the earpiece in the charging box; and
    the magnetic-field control circuit controls, according to results detected by the charging box open/closed-state sensor and the earpiece attitude sensor, whether the earpiece is suspended from the charging box.

2. The wireless earphone of claim 1, wherein the magnetic-field control circuit comprises a spiral coil and a reverse circuit in series, and a permanent magnet is disposed in the earpiece; and
    wherein the magnetic-field control circuit is configured to adjust a conduction state of the reverse circuit according to the results detected by the charging box open/closed-state sensor and the earpiece attitude sensor, and control whether the earpiece is suspended from the charging box by enabling the permanent magnet and a magnetic field generated by the spiral coil to cooperate with each other.

3. The wireless earphone of claim 2, wherein if the charging box open/closed-state sensor detects that the charging box is in the open state and the earpiece attitude sensor detects that the earpiece is in an upward attitude in the charging box, the magnetic-field control circuit controls the reverse circuit to be conducted, the permanent magnet and the magnetic field generated by the spiral coil repel each other since the reverse circuit is conducted, and the earpiece is suspended from the charging box.

4. The wireless earphone of claim 2, wherein if the charging box open/closed-state sensor detects that the charging box is in the closed state and the earpiece attitude sensor detects that the earpiece is in a downward attitude in the charging box, the magnetic-field control circuit controls the reverse circuit to be disconnected, the permanent magnet and the magnetic field generated by the spiral coil attract each other since the reverse circuit is disconnected, and the earpiece is fixedly accommodated in the charging box.

5. The wireless earphone of claim 1, wherein the charging box comprises a charging box cover and a charging box body; and
    wherein the charging box open/closed-state sensor is configured to determine that the charging box is in the open state in a case where a distance between the charging box cover and the charging box body is greater than a preset distance value.

6. The wireless earphone of claim 1, wherein the earpiece attitude sensor is configured to determine that the earpiece is in an upward attitude in the charging box in a case where a resultant force of the earpiece is upward and an included angle between a vertical upward direction and a direction of the resultant force of the earpiece is less than a preset angle.

7. A method for controlling a wireless earphone, comprising:
- detecting, by a charging box open/close-state sensor, an open state of a charging box or a closed state of a charging box;
- detecting, by an earpiece attitude sensor, an orientation attitude of an earpiece in the charging box; and
- controlling, by a magnetic-field control circuit according to results detected by the charging box open/closed-state sensor and the earpiece attitude sensor, whether the earpiece is suspended from the charging box.

8. The method for controlling a wireless earphone of claim 7, wherein controlling, by the magnetic-field control circuit according to the results detected by the charging box open/closed-state sensor and the earpiece attitude sensor, whether the earpiece is suspended from the charging box comprises:
- adjusting, by the magnetic-field control circuit according to the results detected by the charging box open/closed-state sensor and the earpiece attitude sensor, a conduction state of a reverse circuit; and
- controlling whether the earpiece is suspended from the charging box by enabling a permanent magnet and a magnetic field generated by a spiral coil to cooperate with each other according to the conduction state of the reverse circuit.

9. The method of claim 8, wherein if the charging box open/closed-state sensor detects that the charging box is in the open state and the earpiece attitude sensor detects that the earpiece is in an upward attitude in the charging box, the magnetic-field control circuit controls the reverse circuit to be conducted, the permanent magnet and the magnetic field generated by the spiral coil repel each other since the reverse circuit is conducted, and the earpiece is suspended from the charging box.

10. The method of claim 8, wherein if the charging box open/closed-state sensor detects that the charging box is in the closed state and the earpiece attitude sensor detects that the earpiece is in a downward attitude in the charging box, the magnetic-field control circuit controls the reverse circuit to be disconnected, the permanent magnet and the magnetic field generated by the spiral coil attract each other since the reverse circuit is disconnected, and the earpiece is fixedly accommodated in the charging box.

11. The method of claim 7, wherein the charging box comprises a charging box cover and a charging box body; and
- wherein the charging box open/closed-state sensor is configured to determine that the charging box is in the open state in a case where a distance between the charging box cover and the charging box body is greater than a preset distance value.

12. The method of claim 7, wherein the earpiece attitude sensor is configured to determine that the earpiece is in an upward attitude in the charging box in a case where a resultant force of the earpiece is upward and an included angle between a vertical upward direction and a direction of the resultant force of the earpiece is less than a preset angle.

* * * * *